US012476893B2

(12) United States Patent
Mishra et al.

(10) Patent No.: US 12,476,893 B2
(45) Date of Patent: Nov. 18, 2025

(54) POINT-TO-MULTIPOINT SERVICE ASSURANCE USING PERFORMANCE MEASUREMENT

(71) Applicant: Cisco Technology, Inc., San Jose, CA (US)

(72) Inventors: Mankamana Prasad Mishra, San Jose, CA (US); Nitin Kumar, San Jose, CA (US); Vishal Madhav Ninawe, Maharashtra (IN); Rakesh Gandhi, Stittsville (CA)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 18/506,870

(22) Filed: Nov. 10, 2023

(65) Prior Publication Data

US 2025/0158911 A1      May 15, 2025

(51) Int. Cl.
*H04L 43/12*         (2022.01)
*H04L 43/062*        (2022.01)
*H04L 43/0817*       (2022.01)

(52) U.S. Cl.
CPC ............ *H04L 43/12* (2013.01); *H04L 43/062* (2013.01); *H04L 43/0817* (2013.01)

(58) Field of Classification Search
CPC ..... H04L 12/1868; H04L 43/12; H04L 45/16; H04L 45/48; H04L 43/062; H04L 43/0817; H04N 21/6405
See application file for complete search history.

(56) References Cited

U.S. PATENT DOCUMENTS

| 7,940,685 | B1  | 5/2011  | Breslau et al. |
| 7,944,844 | B2* | 5/2011  | Ee ............................ H04L 45/72 |
|           |     |         | 370/254 |
| 10,848,403 | B1* | 11/2020 | Schroeder ............... H04L 43/55 |
| 2013/0028130 | A1 | 1/2013 | Fenner |

(Continued)

FOREIGN PATENT DOCUMENTS

CN            112543107 A        3/2021

OTHER PUBLICATIONS

International Search Report and Written Opinion for International Application No. PCT/US2024/054386, mailed Feb. 3, 2025, 13 Pages.

(Continued)

*Primary Examiner* — Anh Nguyen
(74) *Attorney, Agent, or Firm* — Polsinelli P.C.

(57) ABSTRACT

In some aspects, a computer-implemented method for performance monitoring in a multicast network, includes a controller causing a source router to originate a probe data packet. The controller may also originate, at the source router, the probe data packet, where the probe data packet is a data packet intended to measure performance data associated with one or more legs of a multicast distribution tree. Further, the source router may transmit the probe data packet through the multicast distribution tree using a probe identifier, where when received by a last hop router associated with the one or more legs of the multicast distribution tree, the last hop router redirects the probe data packet to a CPU of the last hop router configured to generate performance statistics. The source router may receive from the last hop router, the performance statistics.

20 Claims, 7 Drawing Sheets

(56) References Cited

U.S. PATENT DOCUMENTS

2014/0029449 A1* 1/2014 Xu .................. H04L 43/10
                                              370/252
2021/0014159 A1* 1/2021 Mishra ............. H04L 45/48
2021/0281895 A1   9/2021 Zijst

OTHER PUBLICATIONS

Lee J., et al., "IP Multicast Resource and Topology Discovery Using a Fan-out Decrement Mechanism", Computer Networks, Elsevier, Amsterdam, NL, vol. 39, No. 4, Jul. 15, 2002, pp. 405-422, XP004359013, ISSN: 1389-1286, DOI: 10.1016/S1389-1286(02)00182-2 Abstract, figure 9, figure 3, p. 419, right-hand column, p. 420, left-hand column.

Ziotopoulos A-G.P., et al., "Estimation of Network Link Loss Rates via Chaining in Multicast Trees", 2001 IEEE International Conference on Acoustics, Speech, and Signal Processing. Proceedings. (ICASSP), Salt Lake City, UT, May 7-11, 2001, [IEEE International Conference on Acoustics, Speech, and Signal Processing (ICASSP)], New York, NY, IEEE, US, May 7, 2001, pp. 2517-2520, XP010803295, DOI: 10.1109/ICASSP.2001.940513 ISBN: 978-0-7803-7041-8, The whole document.

* cited by examiner

POINT-TO-MULTIPOINT SERVICE ASSURANCE USING PERFORMANCE MEASUREMENT

TECHNICAL FIELD

The present technology pertains to multicast networking, and, more specifically, to monitoring performance of a given flow in a multicast network.

BACKGROUND

Multicast networking efficiently sends data from one sender to multiple receivers. Unlike unicast, where data is sent from one sender to one receiver, or broadcast, where data is sent from one sender to all connected devices, multicast is designed for one-to-many or many-to-many communication patterns where multiple recipients are interested in the same data. Multicast is commonly used for applications such as video conferencing, live video streaming, online gaming, and content distribution. It allows these applications to send data to multiple users simultaneously without duplicating the data for each recipient.

While multicast offers many advantages, it also presents challenges in terms of configuration and management, especially in large and complex networks. Properly configuring routers and switches, managing multicast group memberships, and ensuring security can be complex tasks in multicast networks. One benefit to multicast is the ability for data to be simultaneously transmitted along one or more transmit paths using a series of routers. However, this makes it difficult to detect where a delay occurs along within a multicast tree and/or a transmit path.

BRIEF DESCRIPTION OF THE DRAWINGS

To easily identify the discussion of any particular element or act, the most significant digit or digits in a reference number refer to the figure number in which that element is first introduced.

Details of one or more aspects of the subject matter described in this disclosure are set forth in the accompanying drawings and the description below. However, the accompanying drawings illustrate only some typical aspects of this disclosure and are therefore not to be considered limiting of its scope. Other features, aspects, and advantages will become apparent from the description, the drawings and the claims.

DETAILED DESCRIPTION

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure. Thus, the following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be references to the same embodiment or any embodiment; and such references mean at least one of the embodiments.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others.

A used herein the term "configured" shall be considered to interchangeably be used to refer to configured and configurable, unless the term "configurable" is explicitly used to distinguish from "configured". The proper understanding of the term will be apparent to persons of ordinary skill in the art in the context in which the term is used.

The terms used in this specification generally have their ordinary meanings in the art, within the context of the disclosure, and in the specific context where each term is used. Alternative language and synonyms may be used for any one or more of the terms discussed herein, and no special significance should be placed upon whether or not a term is elaborated or discussed herein. In some cases, synonyms for certain terms are provided. A recital of one or more synonyms does not exclude the use of other synonyms. The use of examples anywhere in this specification including examples of any terms discussed herein is illustrative only and is not intended to further limit the scope and meaning of the disclosure or of any example term. Likewise, the disclosure is not limited to various embodiments given in this specification.

Without intent to limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

Aspects of the present disclosure can be implemented in any device, system or network that is capable of transmitting and receiving radio frequency (RF) signals according to one or more of the Institute of Electrical and Electronics Engineers (IEEE) 802.11 standards, the IEEE 802.15 standards, the Bluetooth® standards as defined by the Bluetooth Special Interest Group (SIG), or the Long Term Evolution (LTE), 3G, 4G or 5G (New Radio (NR)) standards promulgated by the 3rd Generation Partnership Project (3GPP), among others. The described implementations can be implemented in any device, system or network that is capable of transmitting and receiving RF signals according to one or more of the following technologies or techniques: code division multiple access (CDMA), time division multiple access (TDMA), frequency division multiple access (FDMA), orthogonal FDMA (OFDMA), single-carrier FDMA (SC-FDMA), single-user (SU) multiple-input multiple-output (MIMO) and multi-user (MU) MIMO. The described implementations also can be implemented using other wireless communication protocols or RF signals suitable for use in one or more of a wireless personal area network (WPAN), a wireless local area network (WLAN), a wireless wide area network (WWAN), or an internet of things (IOT) network.

Overview

In some aspects, a computer-implemented method for performance monitoring in a multicast network may include a source router originating a probe data packet, where the probe data packet is a data packet intended to measure performance data associated with one or more legs of a multicast distribution tree. The source router may transmit the probe data packet through the multicast distribution tree using a probe identifier. When the probe data packet is received by a last hop router associated with the one or more legs of the multicast distribution tree, the last hop router redirects the probe data packet to a CPU of the last hop router configured to generate performance statistics. The source router may receive, from the last hop router, the performance statistics.

In another aspect, the method further includes analyzing the performance statistics to generate data associated with at least two of the one or more legs of the multicast distribution tree, and identifying a leg of the one or more legs for additional monitoring.

In another aspect, the method further includes configuring, at the controller, a multicast group for performance monitoring by reserving an IP address for use in reporting performance statistics.

In another aspect, the probe data packet has a source address associated with the multicast distribution tree.

In another aspect, the method further includes limiting the performance statistics to one or more selected legs of the one or more legs of the multicast distribution tree using a filter.

In another aspect, the method further includes configuring, by the controller, the last hop router to be turned on to be responsive to a probe for performance monitoring, Other technical features may be readily apparent to one skilled in the art from the following figures, descriptions, and claims.

In another aspect, the method further includes identifying one or more nodes associated with the leg of the one or more legs as intermediate nodes, transmitting a second probe data packet and an instruction through the leg of the one or more legs using the probe identifier, where the instruction is transmitted on an underlay network and notifies the intermediate nodes of the second probe data packet, and receiving, from the intermediate nodes, a signal.

In another aspect, the method further includes receiving, by the last hop router, a packet from a source and associated with the multicast group for performance monitoring as a destination IP address, punting the packet to the CPU of the last hop router, and generating, by the CPU of the last hop router, the performance statistics. Other technical features may be readily apparent to one skilled in the art from the following figures, descriptions, and claims.

Example Embodiments

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

The disclosed technology addresses the need in the art for identifying a source of a delay between transmission of content from a server to reception of the content at a receiver. In some applications, any form or duration of delay in transmission can be crucial to the quality of service to a user associated with a receiver. For example, an extended delay in the delivery of live sporting events, stock market data, live aware show presentations, or any other similar time-sensitive live transmission may be detrimental to the user. Evaluation must be done on given flows to identify slow points in the multicast system and generate an appropriate action once the slow points are identified. Currently, there is no method of evaluating the performance of a given flow in a multicast environment to create clear visibility as to how long it is taking data to get to a certain endpoint.

To perform performance evaluation on a multicast network, the multicast network first reserves a particular identification for a performance measurement probe packet. For example, probe packets may be associated with a specific IP address or other identifier, thereby indicating to routers, receivers, and servers in the network to treat the probe packet in a particular manner. To monitor performance, a probe packet may be sent over a given Multicast Distribution Tree (MDT), comprised of a number of servers, receivers, and routers. The probe packet may be originated at the MDT source address used for the associated multicast tree and may be directed to the specific IP address or other identifier associated with the probe packet. The probe packet may be injected into the data stream in the same manner that regular content would be transmitted. When the probe packet is received at one or more last-hop routers, the traffic may be "punted" to the CPU. Each of the last-hop routers may have a hardware entry indicating that traffic originated from the MDT with the probe packet identifier should be redirected to the CPU for processing. The CPU may generate performance data according to the probe packet and transmit the performance data to the controller. The controller (or an originator, like a network administrator) may determine the latency of one or more legs of the MDT. If a latency is detected, node-by-node analysis can be done on the leg, where the probe packet reports back at each router (as opposed to only the last-hop router), thereby allowing the CPU or the originator to determine where the latency is originating.

Figure 1:
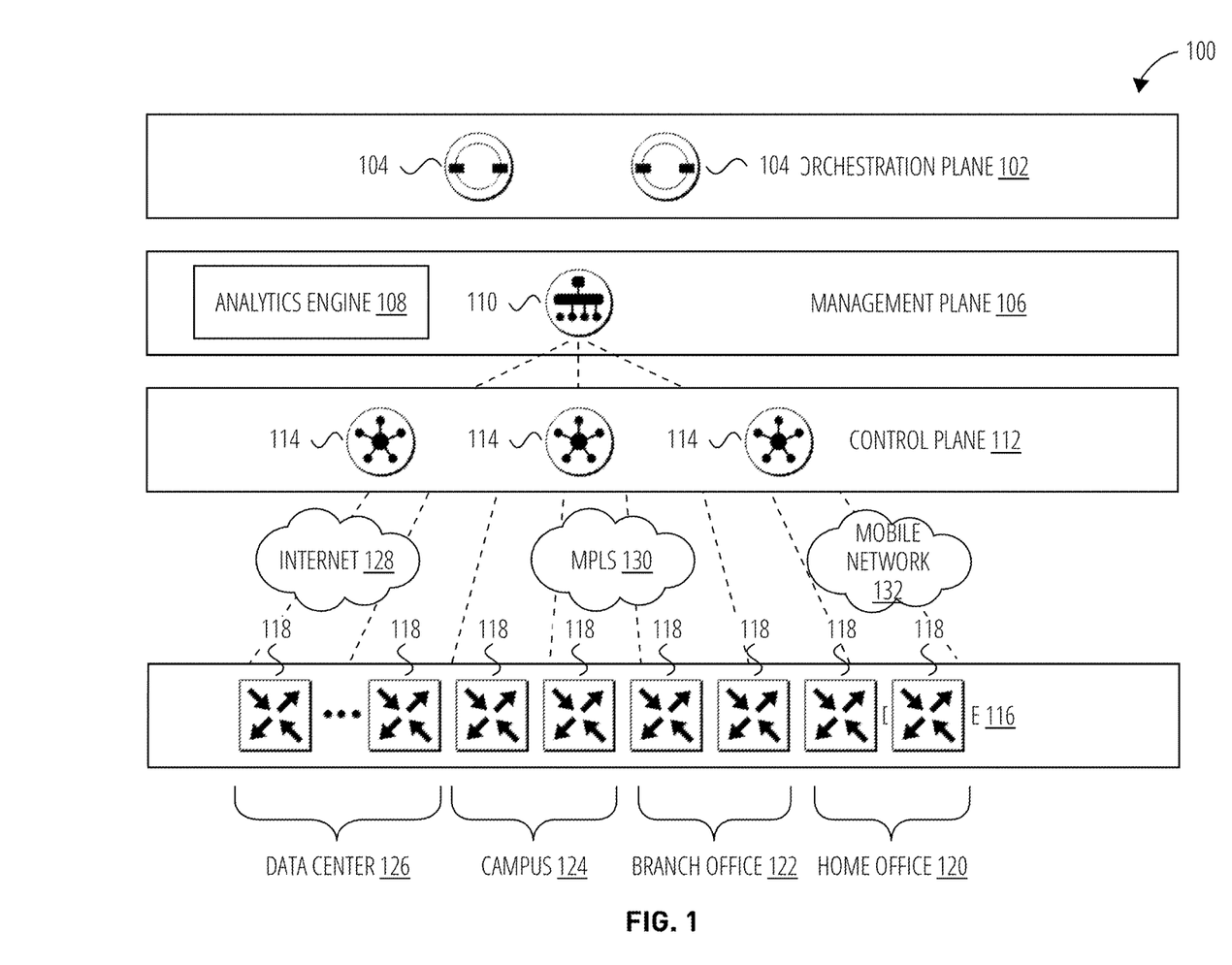
FIG. 1 illustrates an example of a high-level network architecture according to aspects of the present disclosure.

FIG. 1 illustrates an example of a high-level network architecture according to aspects of the present disclosure. An example of an implementation of the network architecture 100 is the Cisco® SD-WAN architecture. However, one of ordinary skill in the art will understand that, for the network architecture 100 and any other system discussed in the present disclosure, there can be additional or fewer component in similar or alternative configurations. The illustrations and examples provided in the present disclosure are for conciseness and clarity. Other embodiments may include different numbers and/or types of elements but one of ordinary skill the art will appreciate that such variations do not depart from the scope of the present disclosure.

In this example, the network architecture 100 can comprise an orchestration plane 102, a management plane 106, a control plane 112, and a data plane 116. The orchestration plane 102 can assist in the automatic on-boarding of edge network devices 118 (e.g., switches, routers, etc.) in an overlay network. The orchestration plane 102 can include one or more physical or virtual network orchestrator appliances 104. The network orchestrator appliances 104 can perform the initial authentication of the edge network devices 118 and orchestrate connectivity between devices of the control plane 112 and the data plane 116. In some embodiments, the network orchestrator appliances 104 can also enable communication of devices located behind Network Address Translation (NAT). In some embodiments, physical or virtual Cisco® SD-WAN vBond appliances can operate as the network orchestrator appliances 104.

The management plane 106 can be responsible for central configuration and monitoring of a network. The management plane 106 can include one or more physical or virtual network management appliances 110. In some embodiments, the network management appliances 110 can provide centralized management of the network via a graphical user interface to enable a user to monitor, configure, and maintain the edge network devices 118 and links (e.g., internet transport network 128, MPLS network 130, 4G/Mobile network 132) in an underlay and overlay network. The network management appliances 110 can support multi-tenancy and enable centralized management of logically isolated networks associated with different entities (e.g., enterprises, divisions within enterprises, groups within divisions, etc.). Alternatively or in addition, the network management appliances 110 can be a dedicated network management system for a single entity. In some embodiments, physical or virtual Cisco® SD-WAN vManage appliances can operate as the network management appliances 110.

The control plane 112 can build and maintain a network topology and make decisions on where traffic flows. The control plane 112 can include one or more physical or virtual network control appliances 114. The network control appliances 114 can establish secure connections to each edge network device 118 and distribute route and policy information via a control plane protocol (e.g., Overlay Management Protocol (OMP) (discussed in further detail below), Open Shortest Path First (OSPF), Intermediate System to Intermediate System (IS-IS), Border Gateway Protocol (BGP), Protocol-Independent Multicast (PIM), Internet Group Management Protocol (IGMP), Internet Control Message Protocol (ICMP), Address Resolution Protocol (ARP), Bidirectional Forwarding Detection (BFD), Link Aggregation Control Protocol (LACP), etc.). In some embodiments, the network control appliances 114 can operate as route reflectors. The network control appliances 114 can also orchestrate secure connectivity in the data plane 116 between and among the edge network devices 118. For example, in some embodiments, the network control appliances 114 can distribute crypto key information among the edge network devices 118. This can allow the network to support a secure network protocol or application (e.g., Internet Protocol Security (IPSec), Transport Layer Security (TLS), Secure Shell (SSH), etc.) without Internet Key Exchange (IKE) and enable scalability of the network. In some embodiments, physical or virtual Cisco® SD-WAN vSmart controllers can operate as the network control appliances 114.

The data plane 116 can be responsible for forwarding packets based on decisions from the control plane 112. The data plane 116 can include the edge network devices 118, which can be physical or virtual edge network devices. The edge network devices 118 can operate at the edges various network environments of an organization, such as in one or more data centers 126, campus networks 124, branch office networks 122, home office networks 120, and so forth, or in the cloud (e.g., Infrastructure as a Service (IaaS), Platform as a Service (PaaS), SaaS, and other cloud service provider networks). The edge network devices 118 can provide secure data plane connectivity among sites over one or more WAN transports, such as via one or more internet transport networks 128 (e.g., Digital Subscriber Line (DSL), cable, etc.), MPLS networks 130 (or other private packet-switched network (e.g., Metro Ethernet, Frame Relay, Asynchronous Transfer Mode (ATM), etc.), mobile networks 132 (e.g., 3G, 4G/LTE, 5G, etc.), or other WAN technology (e.g., Synchronous Optical Networking (SONET), Synchronous Digital Hierarchy (SDH), Dense Wavelength Division Multiplexing (DWDM), or other fiber-optic technology; leased lines (e.g., T1/E1, T3/E3, etc.); Public Switched Telephone Network (PSTN), Integrated Services Digital Network (ISDN), or other private circuit-switched network; small aperture terminal (VSAT) or other satellite network; etc.). The edge network devices 118 can be responsible for traffic forwarding, security, encryption, quality of service (QoS), and routing (e.g., BGP, OSPF, etc.), among other tasks. In some embodiments, physical or virtual Cisco® SD-WAN vEdge routers can operate as the edge network devices 118.

Figure 2:
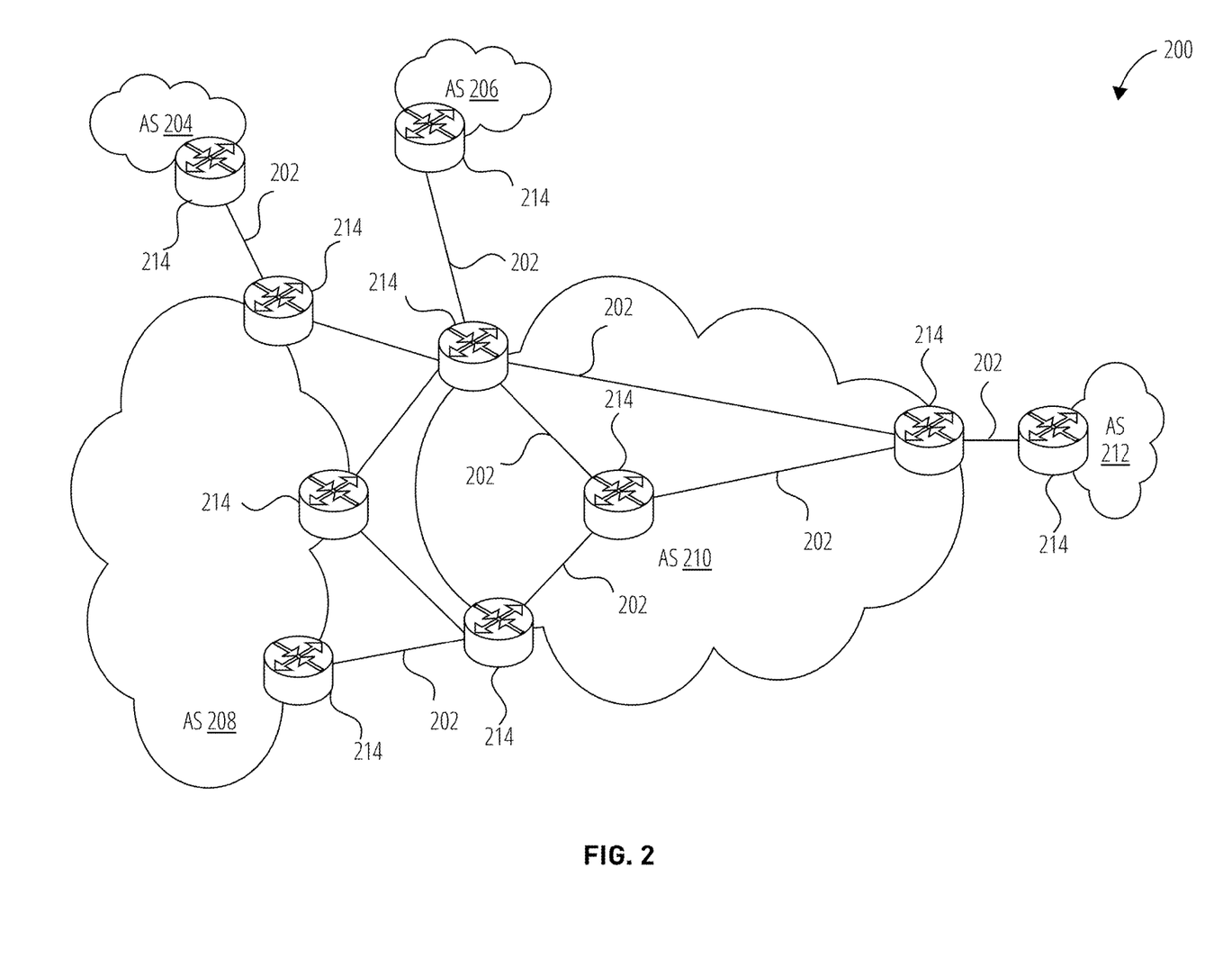
FIG. 2 illustrates an example communication network including one or more autonomous systems (ASes) according to aspects of the present disclosure.

FIG. 2 illustrates an example communication network including one or more autonomous systems (ASes) according to aspects of the present disclosure. A computer network is a geographically distributed collection of nodes interconnected by communication links and segments for transporting data between end nodes, such as personal computers and workstations, or other network devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other.

Since management of interconnected computer networks can prove burdensome, smaller groups of computer networks may be maintained as routing domains or autonomous systems. An Autonomous System (AS) is a network or group of networks under common administration and with common routing policies. A typical example of an AS is a network administered and maintained by an Internet Service Provider (ISP). Customer networks, such as universities or corporations, connect to the ISP, and the ISP routes the network traffic originating from the customer networks to network destinations that may be in the same ISP or may be reachable only through other ISPs.

To facilitate the routing of network traffic through one or more ASes, the network elements of the ASes need to exchange routing information to various network destinations. Border Gateway Protocol (BGP) is an Exterior Gateway Protocol (EGP) that is used to exchange routing information among network elements (e.g., routers) in the same or different ASes. A computer host that executes a BGP process is typically referred to as a BGP host or a BGP network device. To exchange BGP routing information, two BGP hosts, or peers, first establish a transport protocol connection with one another. Initially, the BGP peers exchange messages to open a BGP session, and, after the BGP session is open, the BGP peers exchange their entire routing information. Thereafter, only updates or changes to the routing information are exchanged, or advertised, between the BGP peers. The exchanged routing information is maintained by the BGP peers during the existence of the BGP session.

The networks within an AS are typically coupled together by conventional "intradomain" routers configured to execute intradomain routing protocols, and are generally subject to a common authority. To improve routing scalability, a service provider (e.g., an ISP) may divide an AS into multiple "areas" or "levels." It may be desirable, however, to increase the number of nodes capable of exchanging data; in this case, interdomain routers executing interdomain routing protocols are used to interconnect nodes of the various ASes. Moreover, it may be desirable to interconnect various ASes that operate under different administrative domains. As used herein, an AS, area, or level is generally referred to as a "domain."

FIG. 2 is a schematic block diagram of an example computer network 200 illustratively comprising network devices 214 interconnected by various methods of communication. For instance, the links 202 may be any suitable combination of wired links and shared media (e.g., wireless links, Internet Exchange Points, etc.) where certain network devices 214, such as, e.g., routers, computers, etc., may be in communication with other network devices 214, e.g., based on distance, signal strength, current operational status, location, etc. Those skilled in the art will understand that any number of network devices 214, links, etc. may be used in the computer network, and that the view shown herein is for simplicity.

Data packets (e.g., traffic and/or messages sent between the network devices 214) may be exchanged among the network devices 214 of the computer network 200 using predefined network communication protocols such as certain known wired protocols, as well as wireless protocols or other shared-media protocols where appropriate.

The computer network 200 includes a set of autonomous systems (AS) 204, 206, 208, 210 and 212. The computer network 200 may be positioned in any suitable network environment or communications architecture that operates to manage or otherwise direct information using any appropriate routing protocol or data management standard. For example, computer network 200 may be provided in conjunction with a border gateway protocol (BGP).

As noted above, an AS may be a collection of connected Internet Protocol (IP) routing network devices 214 under the control of one or more network operators that presents a common, clearly defined routing policy to a network (e.g., the Internet). Usually, an AS comprises network devices 114 that are established on the edge of the system, and that serve as the system's ingress and egress points for network traffic. Moreover, the network devices 214 may be considered edge network devices, border routers, or core network devices within the respective AS. These network devices typically, but not always, are routers or any other element of network infrastructure suitable for switching or forwarding data packets according to a routing protocol or switching protocol. For the purposes of the present disclosure, the network devices 214 located within an AS may alternatively be referred to as "forwarding network devices" or "intermediate network devices." Moreover, for illustration purposes, the ASes 204, 206, 208, 210, and 212 are shown with a limited number of network devices 214. In an actual implementation, however, an AS normally comprises numerous routers, switches, and other elements.

Each AS 204, 206, 208, 210, and 212 may be associated with an Internet Service provider (ISP). Even though there may be multiple ASes supported by a single ISP, the Internet only sees the routing policy of the ISP. That ISP must have an officially registered Autonomous System Number (ASN). As such, a unique ASN is allocated to each AS for use in BGP routing. ASNs are important primarily because they uniquely identify each network on the Internet.

To facilitate the routing of network traffic through the ASes, or more specifically, the network devices 214 within the ASes, the network devices may exchange routing information to various network destinations. As described above, BGP is conventionally used to exchange routing and reachability information among network devices 214 within a single AS or between different ASes. One particular example of BGP is BGPv4, as defined in Request for Comments (RFC) 1771 of the Internet Engineering Task Force (IETF). Various embodiments may implement other versions of BGP, however, and the use of BGPv4 is not required. The BGP logic of a router is used by the data collectors to collect BGP AS path information, e.g., the "AS_PATH" attribute, as described further below, from BGP tables of border routers of an AS, to construct paths to prefixes.

To exchange BGP routing information, two BGP hosts (network devices 214), or peers, first establish a transport protocol connection with one another. Initially, the BGP peers exchange messages to open a BGP session, and, after the BGP session is open, the BGP peers exchange their entire routing information. Thereafter, in certain embodiments, only updates or changes to the routing information, e.g., the "BGP UPDATE" attribute, are exchanged, or advertised, between the BGP peers. The exchanged routing information is maintained by the BGP peers during the existence of the BGP session.

The BGP routing information may include the complete route to each network destination, e.g., "destination network device," that is reachable from a BGP host. A route, or path, comprises an address destination, which is usually represented by an address prefix (also referred to as prefix), and information that describe the path to the address destination. The address prefix may be expressed as a combination of a network address and a mask that indicates how many bits of the address are used to identify the network portion of the address. In Internet Protocol version 4 (IPv4) addressing, for example, the address prefix can be expressed as "9.2.0.2/16". The "/16" indicates that the first 16 bits are used to identify the unique network leaving the remaining bits in the address to identify the specific hosts within this network.

A path joining a plurality of ASes, e.g., links 202, may be referred to as an "AS_PATH." The AS_PATH attribute indicates the list of ASes that must be traversed to reach the address destination. For example, as illustrated in FIG. 2, the AS 212 may store an AS_PATH attribute of "204 206 210 212" where the address destination is the AS 212 (or a particular IP address within AS 212). Here, the AS_PATH attribute indicates that the path to the address destination AS 212 from AS 208 passes through ASes 204, 206 and 210, in that order.

Although it may be preferable that all network devices 214 in the respective ASes 204, 206, 208, 210, and 212 be configured according to BGP, in a real-world implementation, it may be unlikely that each network device communicates using BGP. Thus, the disclosed embodiments are applicable to scenarios where all network devices 214 in the computer network 200 are configured according to BGP, as well as scenarios where only a subset of the network devices 214 is configured as such. Moreover, between any of the ASes, there may be a single communication path 202, e.g., between AS 204 and AS 208, as shown in FIG. 2, or there may be multiple communication paths 202, e.g., between AS 208 and AS 210. Thus, the disclosed embodiments are applicable to either case, as described in further detail below.

Moreover, a security extension to the BGP has been developed, referred to as BGPSEC, which provides improved security for BGP routing. BGP does not include mechanisms that allow an AS to verify the legitimacy and authenticity of BGP route advertisements. The Resource Public Key Infrastructure (RPKI) provides a first step towards addressing the validation of BGP routing data. BGPSEC extends the RPKI by adding an additional type of certificate, referred to as a BGPSEC router certificate, that binds an AS number to a public signature verification key, the corresponding private key of which is held by one or more BGP speakers within this AS. Private keys corresponding to public keys in such certificates can then be used within BGPSEC to enable BGP speakers to sign on behalf of their AS. The certificates thus allow a relying party to verify that a BGPSEC signature was produced by a BGP speaker belonging to a given AS. Thus, a goal of BGPSEC is to use signatures to protect the AS Path attribute of BGP update messages so that a BGP speaker can assess the validity of the AS Path in update messages that it receives. It should be understood, however, that the embodiments for implementing AS Path security disclosed herein are not limited to BGPSEC; certain embodiments may, additionally or alternatively, be applicable to other suitable protocols, including, for example, SoBGP, S-BGP, and PGPBGP, to name just a few.

Figure 3A:
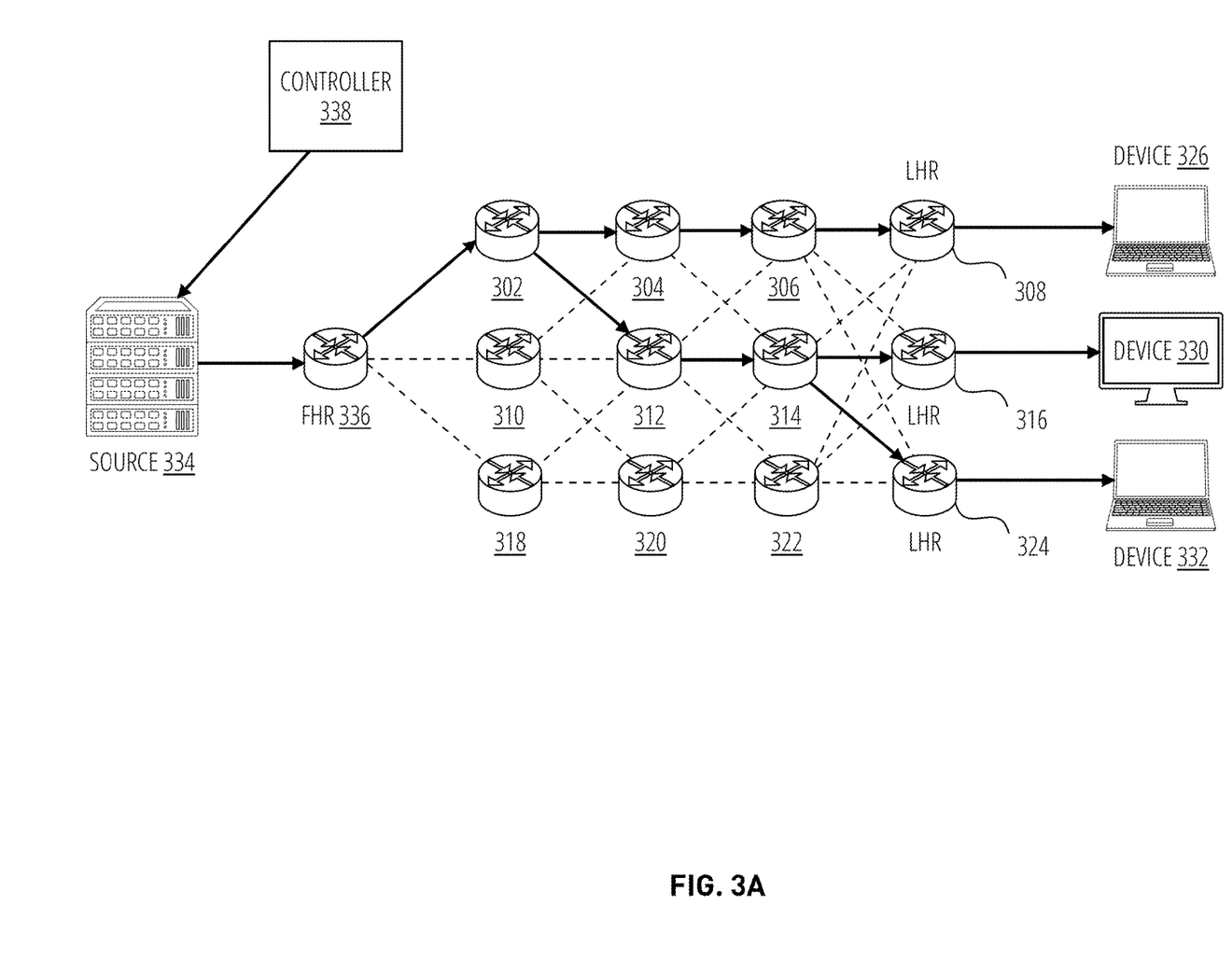
FIG. 3A illustrates an example diagram for monitoring performance on a multicast network according to aspects of the present disclosure.

FIG. 3A illustrates an example diagram for monitoring performance on a multicast network according to aspects of the present disclosure. The multicast network may be comprised of one or more multicast distribution trees (MDT) that distribute data packets to one or more receiving devices. Within the MDTs, there may be one or more legs of the MDT connecting a source device to a receiving device. In some examples, a leg of the one or more legs may encounter a delay due to software failure, hardware failure, interference, or some other issue that causes a delay between the transmission of the data and the receipt of the data at a receiver associated with the leg. Once data is transmitted from the source, it is difficult to ascertain where the delay occurs within the MDT and/or the leg due to the nature of multicast networks. However, introducing a probing packet as a form of "data transmission" to the MDT allows a central controller and/or an originator (e.g., a network administrator, a user, etc.) to identify potential delays and/or latencies on the MDT.

The multicast network illustrated in FIG. 3A is comprised of a controller 338 associated with source 334. The multicast network may be a computer network (e.g., a local area network (LAN), a wide area network (WAN), etc.) comprised of one or more sources, receivers, and routers. The multicast network may be configured to include one or more MDTs, which identify the transmit path(s) of data transmitted from a source (e.g., source 334) to a receiver (e.g., device 326, device 330, and/or device 332). Controller 338 may manage source 334 and may dictate transmissions sent from source 334. Source 334 may be associated with first hop router (FHR) 336, which may be the initial router connection from source 334 to the multicast network. Routers 302, 304, 306, 310, 312, 314, 318, 320, and 322 may be routers illustrative of one or more potential routes a transmission could take from source 334 to a receiver. Routers 302, 304, 306, 310, 312, 314, 318, 320, and 322 may be connected to the multicast network and configured as next-hop routers. LHR 308, LHR 316, and LHR 324 may be associated with respective receivers. For example, LHR 308 may be associated with device 326, LHR 316 may be associated with device 330, and LHR 324 may be associated with device 332.

In some examples, device 326, device 330, device 332, and source 334 may comprise a multicast distribution tree (MDT). To initialize the MDT, receivers may send a membership request to respective last hop routers. For example, device 326 would transmit a membership request to LHR 308. LHR 308 may initiate an overlay join using a known address of a node in the MDT (e.g., source 334). LHR 308 may request information for the corresponding underlay tree associated with the requested MDT. Hop-by-hop label mapping may be exchanged from source 334 to device 326, demonstrating the transmit route of data from source 334 to device 326. For example, the label mapping may include, for device 326, FHR 336, router 302, router 304, router 306, and LHR 308. The above process may be repeated for device 330 and device 332, thereby connecting them to the MDT.

The transmit paths between source 334 and a receiver may comprise a "leg" of the MDT. The MDT may contain one or more legs. The one or more legs may include unique routers, but may also share routers. For example, the transmit path between source 334 and device 326 may comprise a first leg, the transmit path between source 334 and device 330 may comprise a second leg, and the transmit path between source 334 and device source 334 may comprise a third leg.

When data is transmitted from a source, the data begins traveling along the one or more legs of the MDT. Once a transmission on the multicast network reaches a last hop router, the last hop router transmits the transmission to a respective device. For example, any transmission received at LHR 308 may be forwarded to device 326 accordingly. The routes illustrated on the routers within the multicast network that connect source 334 to device 326, device 330, and device 332 illustrate the shortest available path to connect source 334 to the receivers via the routers in the network. In some examples, the shortest available path is not available for one or more reasons, including hardware or software failures, and the transmission may be routed through an alternative route illustrated by the dotted lines connecting the routers on the multicast network.

To perform performance monitoring of the MDT of the multicast network, controller 338 may reserve a multicast group address for performance monitoring. By reserving the multicast group address for performance monitoring, sources, routers, receivers, and any other involved devices are capable of identifying data that is associated with a probe packet. For example, 224.0.0.151 may be the multicast group address for performance monitoring. The multicast group address for performance monitoring may be a prefix, indicator, address, or any other method appropriate for identifying a probe packet (e.g., an IP address).

Controller 338 may instruct source 334 and/or FHR 336 to originate the probe packet. FHR 336 may originate the probe packet, and the probe packet may be associated with at least two addresses: the multicast group address for performance monitoring (e.g., 224.0.0.151) and an address associated with the MDT (e.g., the standard source address associated with the MDT that may be used in transmissions not associated with performance monitoring). In some examples, the destination of the probe packet may be indicated as the multicast group address for performance monitoring and the source of the probe packet may be the address associated with the MDT.

Controller 338 may configure the last hop routers (e.g., LHR 308, LHR 316, and LHR 324) associated with the MDT to response accordingly upon receipt of a probe packet. The last hop routers may be configured to be responsive to a probe for performance monitoring (e.g., the probe packet). In some examples, the last hop routers associated with the MDT may include a hardware entry that may instruct the last hop routers to respond appropriately to receiving a data packet associated with the multicast group address for performance monitoring (e.g., a probe packet). The hardware entry may be configured by controller 338, a network administrator, the multicast network, any combination thereof, or the like. The hardware entry may instruct the last hop routers of the MDT to punt the probe packet to a CPU. The CPU may be associated with the last hop routers and/or each respective last hop router. For example, when the probe packet reaches LHR 308, the probe packet would be punted to a CPU associated with LHR 308. In some examples, in lieu of a hardware entry, controller 338 may initiate programming for a designated multicast transmit route of the MDT.

FHR 336 may transmit the probe packet to the MDT. The probe packet may travel along the legs of the MDT via routers 302, 304, 306, 310, 312, 314, 318, 320, and 322. For example, the probe packet may travel from FHR 336, to router 302, to router 304, to router 306, and then to LHR 308. After transmission through the legs of the MDT, the probe packet may be received at the last hop routers associated with the MDT. For example, the probe packet may be received at LHR 308, LHR 316, and LHR 324. According to either the hardware entry at the last hop routers or the designated multicast transmit route, LHR 308, LHR 316, and LHR 324 may transmit the probe packet to the CPU instead of forwarding the probe packet to respective receivers. The probe packet may be injected into the MDT with an multiprotocol label switching (MPLS) header. The MPLS header and/or an MPLS label associated with the probe packet may be the same as the MPLS header and/or the MPLS label associated with typical transmissions (e.g., not probe packets).

FHR 336 may receive performance data associated with the probe packet after the probe packet is received at the last hop routers. The CPU may generate the performance data to transmit to controller 338. In some examples, the performance statistics may be limited to one or more selected legs of the MDT. This may be performed by a filter applied to the MDT. For example, only two of the three last hop routers of a MDT (e.g., LHR 308 and LHR 316 as described in FIG. 3A) may transmit performance statistics. As another example, LHR 308 may send performance data regarding the transmit path from source 334, to FHR 336, to router 302, to router 304, to router 306, and to LHR 308. FHR 336 may transmit the received performance data to controller 338. Using the performance data, controller 338 may calculate latency and/or delay associated with a particular leg of the MDT. The latency and/or delay may be For example, controller 338 may calculate the latency from FHR 336 to LHR 308, FHR 336 to LHR 316, and FHR 336 to LHR 324.

Figure 3B:
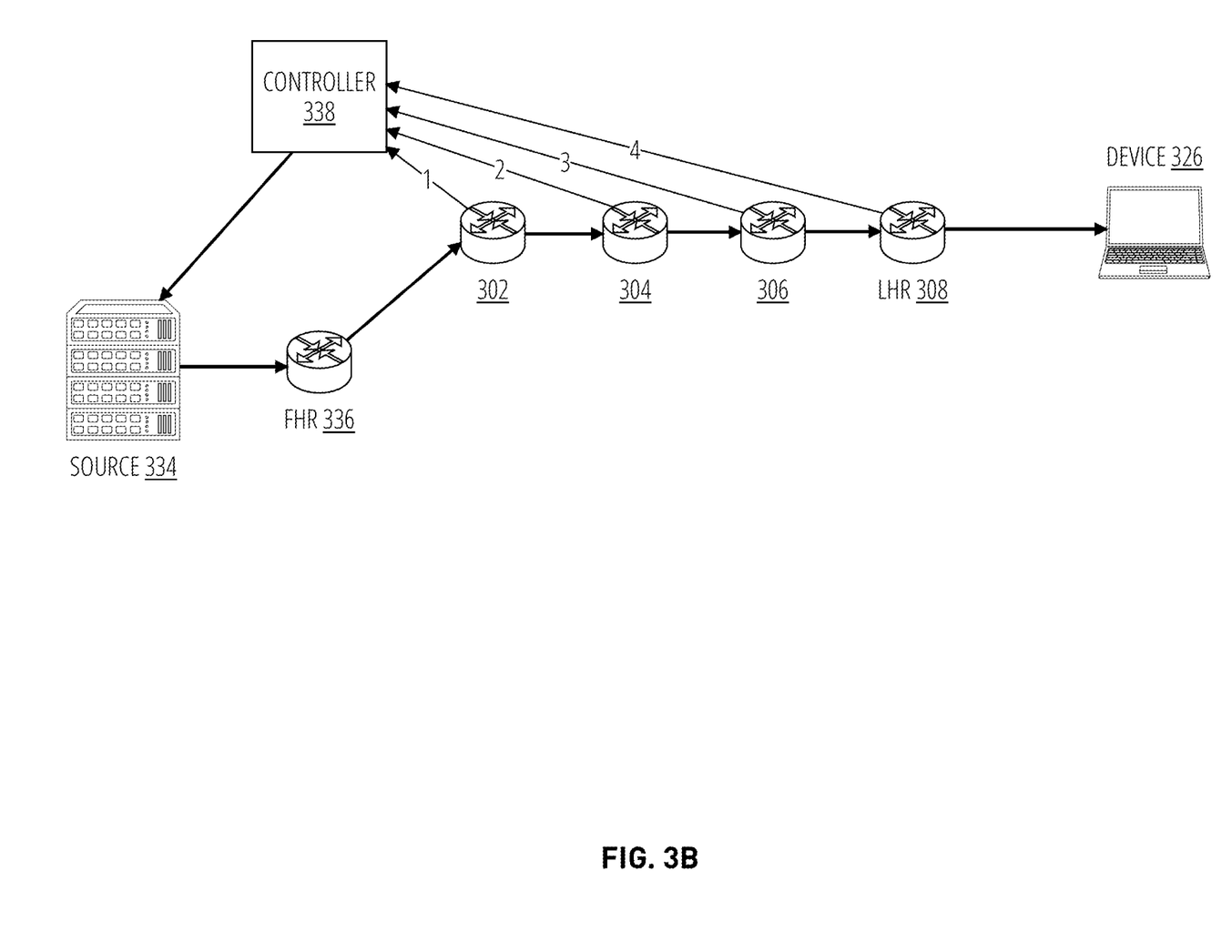
FIG. 3B illustrates an example diagram for monitoring a branch of the multicast network according to aspects of the present disclosure.

FIG. 3B illustrates an example diagram for monitoring a branch of the multicast network according to aspects of the present disclosure. In some examples, the performance data received by controller 338 indicates that a leg of one or more legs of an MDT is reporting latency, delay, or another issue resulting in service issues at a receiver. For example, the performance data may indicate that the FHR 336 to LHR 308 leg has a higher latency than the remaining two legs of the MDT. As a result of the higher latency, device 326 may perceive a delay in content that disrupts customer satisfaction. Device 330 and device 332 (FIG. 3A) may receive a data packet from source 334 nanoseconds, milliseconds, seconds, or any length of time before device 326. For example, device 330 and device 332 may receive notification of a major play in a sporting event before device 326. To identify the source of the latency or other issues on the leg, targeted performance monitoring using hop-by-hop signaling may be initiated on the leg. For example, as shown in FIG. 3B, targeted performance monitoring may be performed on the FHR 336-to-LHR 308 leg.

To perform targeted performance monitoring, controller 338 may instruct devices associated with the leg (e.g., mid-point nodes, intermediate nodes, next-hop routers, etc.) to act as "bud" nodes. Controller 338 may instruct the devices associated with the leg using an underlay join (e.g., including an extra instructional bit in an MPLS header associated with a probe packet). For example, controller 338 may instruct router 302, router 304, and router 306 to act as bud nodes. Router 302, router 304, and router 306 may act as a bud node, which indicates that router 302, router 304, and router 306 would act as egress nodes and/or mid-point nodes for received traffic. For example, router 302, router 304, and router 306 may both forward decapsulated data outside of the nodes of the MDT (e.g., acting as an egress node) and forward encapsulated data to one or more next-hop routers within the MDT (e.g., acting as a mid-point node).

Controller 338 may instruct source 334 and/or FHR 336 to inject a second probe packet into the MDT. When the second probe packet is received at router 302, router 302 may transmit a performance data metric to controller 338 in communication 1, as seen in FIG. 3B. Router 302 may forward the second probe packet to router 304. Router 304, upon receipt of the second probe packet, may transmit the performance data metric to controller 338 in communication 2 and forward the second probe packet to router 306. Router 306 may then, upon receipt of the second probe packet, may also transmit the performance data metric to controller 338 in communication 3. Finally, router 306 may forward the second data packet to LHR 308 and LHR 308 provides the performance data metric to controller 338 in communication 4. As with the probe packet described in FIG. 3A, LHR 308 punts the second probe packet to the CPU and does not forward the second probe packet to device 326. In some examples, other devices associated with the MDT may also receive the second probe packet. However, due to the instructions from controller 338 (e.g., the underlay join), the other devices may not process the extra bit in the MPLS header of the second probe packet and may identify the second probe packet as a standard probe packet (e.g., the probe packet discussed in FIG. 3A) and may treat the second probe packet accordingly.

Using the performance data metric received from the devices associated with the leg (e.g., router 302, router 304, router 306, and LHR 308), controller 338 and/or an associated device may identify a portion of the leg that is causing an issue on the leg. For example, the transmission of the second probe packet from router 304 to router 306 may take twice as long as the transmission of the second probe packet from router 302 to router 304 and router 306 to LHR 308, thereby indicating a delay, latency, or other performance issue between the nodes of router 304 and router 306. Using the performance data metrics, controller 338, the originator, the network administrator, and/or any associated device may partake in remedial measures to fix the physical topology of the affected leg. For example, controller 338 may identify a redundant source to source 334 in a different location that may bypass router 304 and router 306.

Figure 4:
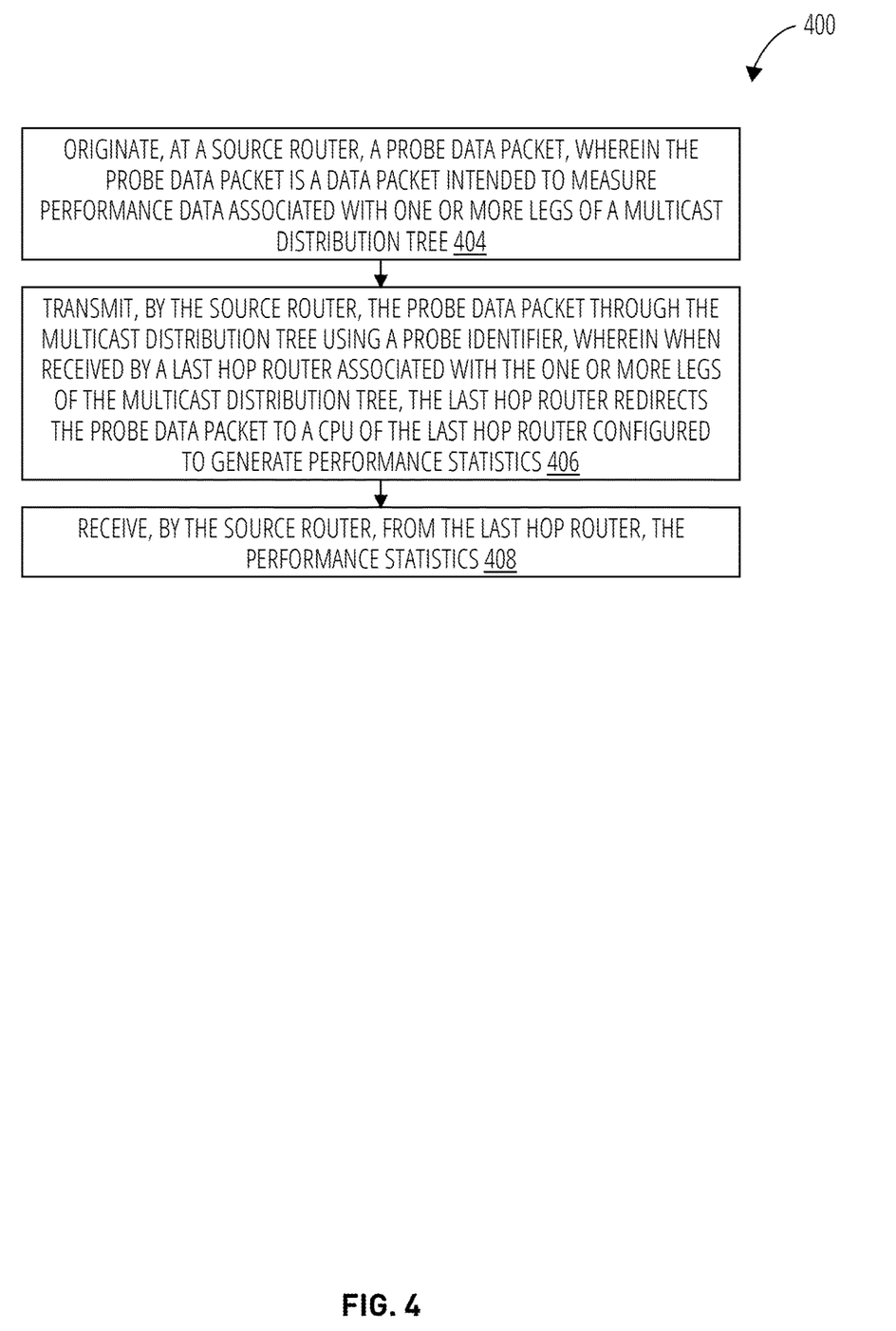
FIG. 4 illustrates an example flowchart for monitoring performance on a multicast network according to aspects of the present disclosure.

FIG. 4 illustrates an example flowchart for monitoring performance on a multicast network according to aspects of the present disclosure. Although the example routine 400 depicts a particular sequence of operations, the sequence may be altered without departing from the scope of the present disclosure. For example, some of the operations depicted may be performed in parallel or in a different sequence that does not materially affect the function of the routine 400. In other examples, different components of an example device or system that implements the routine 400 may perform functions at substantially the same time or in a specific sequence.

According to some examples, the method includes originating, at the source router, the probe data packet, wherein the probe data packet is a data packet intended to measure performance data associated with one or more legs of an MDT at block 404. For example, FHR 336 (as described in FIG. 3A) may originate the probe data packet intended to measure performance data associated with one or more legs of an MDT. A controller, the source router, and one or more other devices (e.g., routers, receivers, devices, etc.) may be associated with a multicast distribution tree (MDT) with one or more legs. The controller may instruct the source router to originate the probe data packet, and the source router may originate the probe data packet according to one or more specifications from the controller, including, but not limited to, the source address, the destination address, and any additional data included in an MPLS header of the probe packet.

The probe data packet may be configured to gather data pertaining to the one or more legs of a multicast distribution tree. The one or more legs may be associated with a transmit path from the source router to a receiver and may include one or devices (e.g., routers) forwarding the probe data packet to the next subsequent device in the transmit path until the probe data packet reaches a last hop router associated with a receiver. While the probe data packet is traveling along the transmit path, it may gather data pertaining to transmit path latency, data loss, hardware malfunctions, software malfunctions, time stamps, efficiency, connection strength, or any other metrics related to performance monitoring.

According to some examples, the method includes transmitting, by the source router, the probe data packet through the MDT using a probe identifier, wherein when received by a last hop router associated with the one or more legs of the MDT, the last hop router redirects the probe data packet to a CPU of the last hop router configured to generate performance statistics at block 406. For example, FHR 336 (as described in FIG. 3A) may transmit the probe data packet through the MDT using a probe identifier, which may be the group address specific to the reserved multicast group for performance monitoring. The probe data packet may be configured, according to instructions from the controller, with the group address specific to the reserved multicast group for performance monitoring. In some examples, the probe data packet may also be configured with a source address associated with the source router (e.g., source 334 and/or FHR 336) and/or the MDT.

The last hop routers associated with the MDT (e.g., LHR 308, LHR 316, and LHR 324 as described in FIG. 3A) may be instructed by the controller to punt the probe data packet to associated CPUs (e.g., the CPU of the respective last hop router) instead of forwarding the probe data packet to an associated receiver. The associated CPUs may generate the performance statistics.

According to some examples, the method includes receiving, by the source router, from the last hop router, the performance statistics at block 408. For example, FHR 336 (as described in FIG. 3A) may receive the performance statistics from one or more last hop routers, including LHR 308, LHR 316, and/or LHR 324. In some examples, the last hop routers may transmit the performance data to the source router, and the source router may subsequently transmit the performance statistics to the controller. In some other examples, the last hop routers may transmit the performance data directly to the controller.

The controller may generate data using the performance statistics to identify delays, latencies, or other issues that may impact the quality of service for the multicast network and/or the MDT. The controller may generate data pertaining to the entirety of the MDT, a portion of the MDT, and/or one or more individual legs of the MDT. Using the data, the controller may identify a leg of the one or more individual legs for additional monitoring. Once the leg has been identified for additional monitoring, the controller may instruct devices associated with the leg to act as intermediate nodes (e.g., "bud" nodes), which indicates that the devices would act as egress and mid-point nodes along the leg. In some examples, the devices may be nodes (e.g., routers).

The controller may instruct the source router to originate and transmit a second probe data packet and an instruction through the leg of the one or more legs using the probe identifier, wherein the instruction is transmitted on an underlay network and notifies the intermediate nodes of the second probe data packet. Upon receipt of the second data packet at an intermediate node, the intermediate node may transmit a signal to the controller. The controller may generate additional data pertaining to the leg of the one or more legs using the signals from the intermediate nodes. The additional data may indicate portions of the leg that may contribute to the identified issues associated with the leg.

Figure 5:
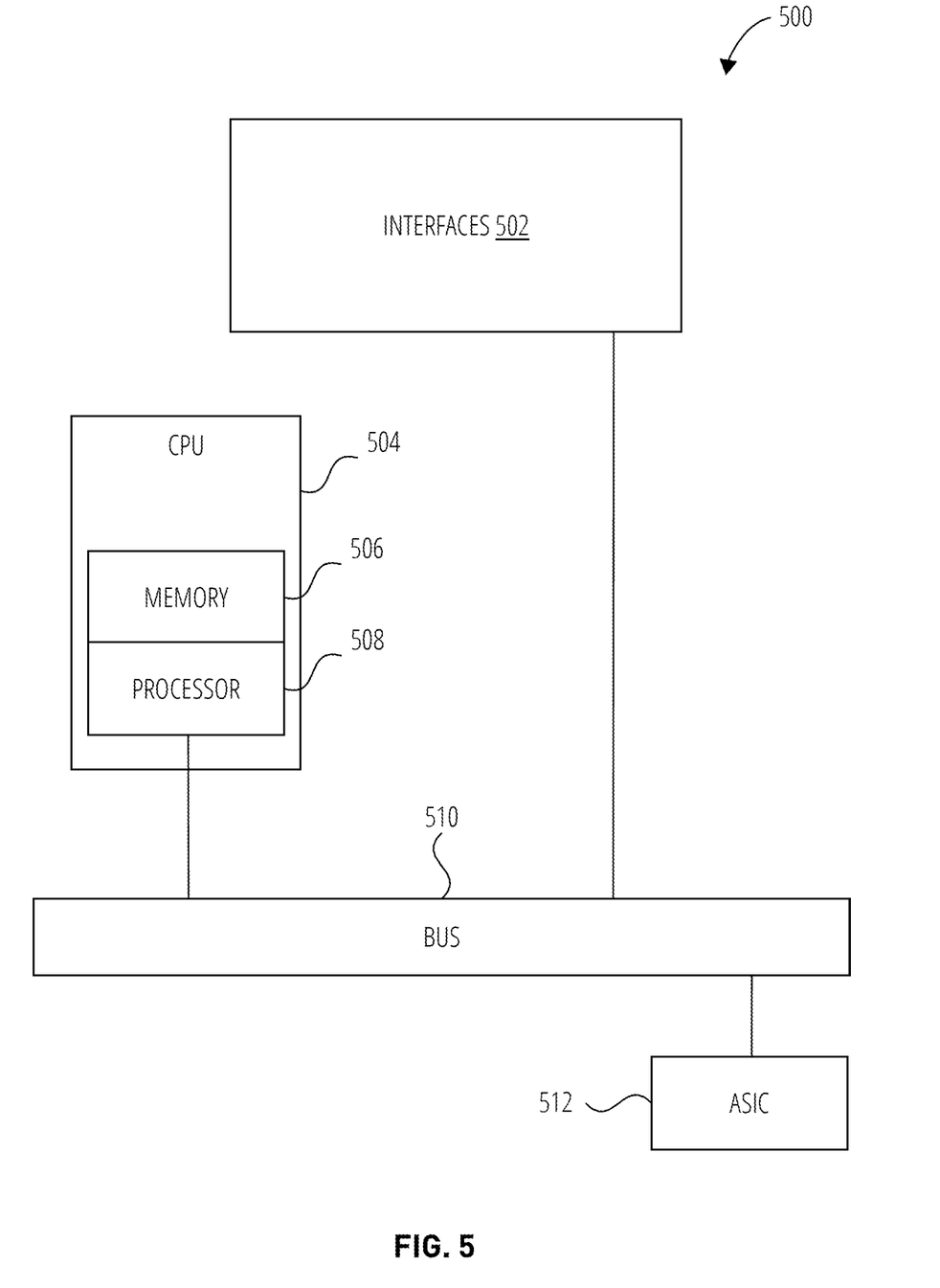
FIG. 5 illustrates an example network device suitable for performing switching, routing, load balancing, and other networking operations according to aspects of the present disclosure.

FIG. 5 illustrates an example network device suitable for performing switching, routing, load balancing, and other networking operations according to aspects of the present disclosure. The example network device 500 can be implemented as switches, routers, nodes, metadata servers, load balancers, client devices, and so forth.

Network device 500 includes a central processing unit (CPU) 504, interfaces 502, and a bus 510 (e.g., a PCI bus). When acting under the control of appropriate software or firmware, the CPU 504 is responsible for executing packet management, error detection, and/or routing functions. The CPU 504 preferably accomplishes all these functions under the control of software including an operating system and any appropriate applications software. CPU 504 may include one or more processors 508, such as a processor from the INTEL X86 family of microprocessors. In some cases, processor 508 can be specially designed hardware for controlling the operations of network device 500. In some cases, a memory 506 (e.g., non-volatile RAM, ROM, etc.) also forms part of CPU 504. However, there are many different ways in which memory could be coupled to the system.

The interfaces 502 are typically provided as modular interface cards (sometimes referred to as "line cards"). Generally, they control the sending and receiving of data packets over the network and sometimes support other peripherals used with the network device 500. Among the interfaces that may be provided are Ethernet interfaces, frame relay interfaces, cable interfaces, DSL interfaces, token ring interfaces, and the like. In addition, various very high-speed interfaces may be provided such as fast token ring interfaces, wireless interfaces, Ethernet interfaces, Gigabit Ethernet interfaces, ATM interfaces, HSSI interfaces, POS interfaces, FDDI interfaces, WIFI interfaces, 3G/4G/5G cellular interfaces, CAN BUS, LoRA, and the like. Generally, these interfaces may include ports appropriate for communication with the appropriate media. In some cases, they may also include an independent processor and, in some instances, volatile RAM. The independent processors may control such communications intensive tasks as packet switching, media control, signal processing, crypto processing, and management. By providing separate processors for the communication intensive tasks, these interfaces allow the master CPU (e.g., 504) to efficiently perform routing computations, network diagnostics, security functions, etc.

Although the system shown in FIG. 5 is one specific network device of the present disclosure, it is by no means the only network device architecture on which the present disclosure can be implemented. For example, an architecture having a single processor that handles communications as well as routing computations, etc., is often used. Further, other types of interfaces and media could also be used with the network device 500.

Regardless of the network device's configuration, it may employ one or more memories or memory modules (including memory 506) configured to store program instructions for the general-purpose network operations and mechanisms for roaming, route optimization and routing functions described herein. The program instructions may control the operation of an operating system and/or one or more applications, for example. The memory or memories may also be configured to store tables such as mobility binding, registration, and association tables, etc. Memory 506 could also hold various software containers and virtualized execution environments and data.

The network device 500 can also include an application-specific integrated circuit (ASIC) 512, which can be configured to perform routing and/or switching operations. The ASIC 512 can communicate with other components in the network device 500 via the bus 510, to exchange data and signals and coordinate various types of operations by the network device 500, such as routing, switching, and/or data storage operations, for example.

Figure 6:
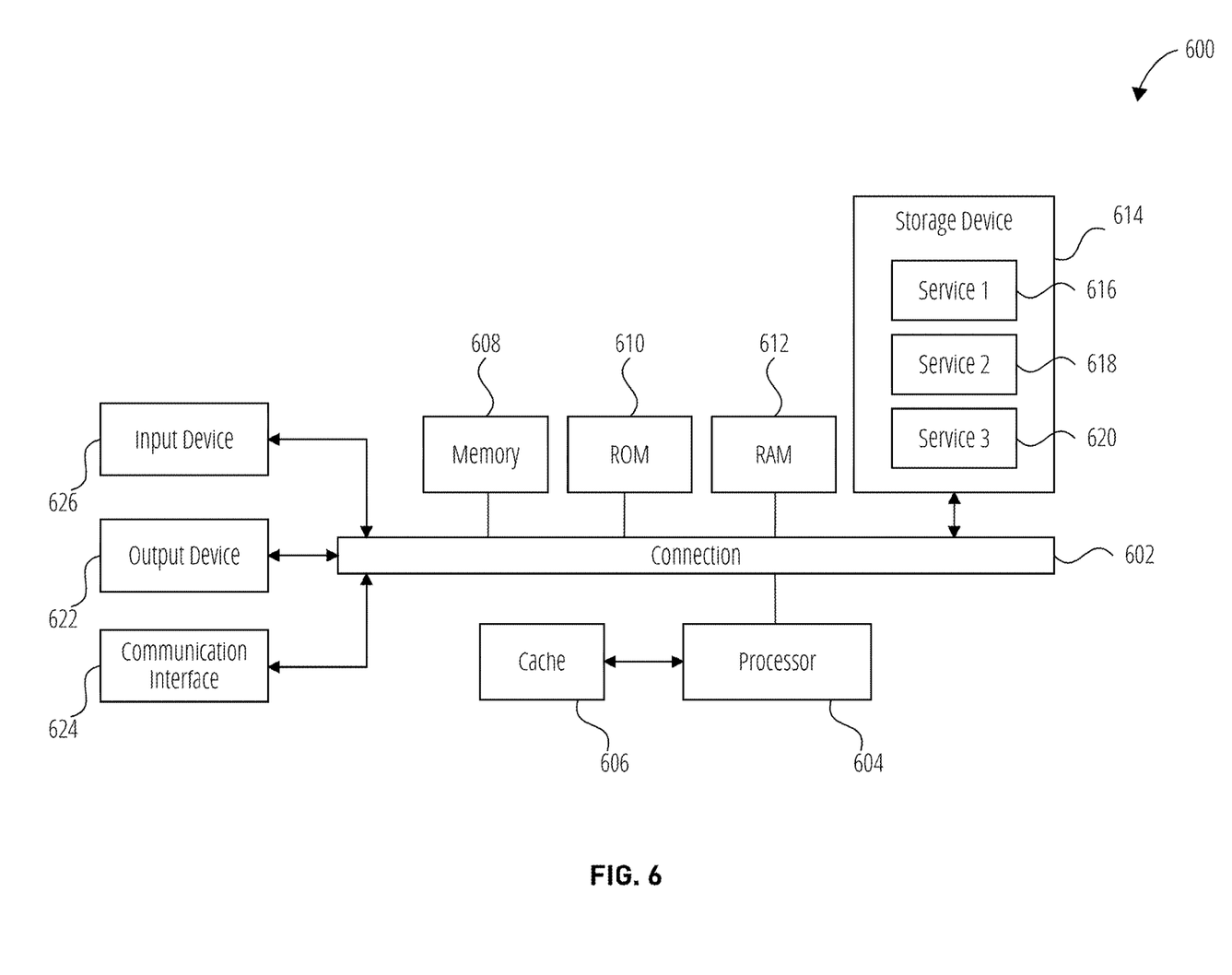
FIG. 6 shows an example of a system for implementing performance monitoring on a multicast network according to aspects of the present disclosure.

FIG. 6 shows an example of a computing system 600, which can be for example any computing device making for implementing performance monitoring on a multicast network, or any component thereof in which the components of the system are in communication with each other using connection 602. Connection 602 can be a physical connection via a bus, or a direct connection into processor 604, such as in a chipset architecture. Connection 602 can also be a virtual connection, networked connection, or logical connection.

In some embodiments, computing system 600 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example computing system 600 includes at least one processing unit (CPU or processor) 604 and connection 602 that couples various system components including system memory 608, such as read-only memory (ROM) 610 and random access memory (RAM) 612 to processor 604. Computing system 600 can include a cache of high-speed memory 606 connected directly with, in close proximity to, or integrated as part of processor 604.

Processor 604 can include any general purpose processor and a hardware service or software service, such as services 616, 618, and 620 stored in storage device 614, configured to control processor 604 as well as a special-purpose processor where software instructions are incorporated into the actual processor design. Processor 604 may essentially be a completely self-contained computing system, containing multiple cores or processors, a bus, memory controller, cache, etc. A multi-core processor may be symmetric or asymmetric.

To enable user interaction, computing system 600 includes an input device 626, which can represent any number of input mechanisms, such as a microphone for speech, a touch-sensitive screen for gesture or graphical input, keyboard, mouse, motion input, speech, etc. Computing system 600 can also include output device 622, which can be one or more of a number of output mechanisms known to those of skill in the art. In some instances, multimodal systems can enable a user to provide multiple types of input/output to communicate with computing system 600. Computing system 600 can include communication interface 624, which can generally govern and manage the user input and system output. There is no restriction on operating on any particular hardware arrangement, and therefore the basic features here may easily be substituted for improved hardware or firmware arrangements as they are developed.

Storage device 614 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read-only memory (ROM), and/or some combination of these devices.

The storage device 614 can include software services, servers, services, etc., that when the code that defines such software is executed by the processor 604, it causes the system to perform a function. In some embodiments, a hardware service that performs a particular function can include the software component stored in a computer-readable medium in connection with the necessary hardware components, such as processor 604, connection 602, output device 622, etc., to carry out the function.

For clarity of explanation, in some instances, the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program or a collection of programs that carry out a specific function. In some embodiments, a service can be considered a server. The memory can be a non-transitory computer-readable medium.

In some embodiments, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer-readable media. Such instructions can comprise, for example, instructions and data which cause or otherwise configure a general purpose computer, special purpose computer, or special purpose processing device to perform a certain function or group of functions. Portions of computer resources used can be accessible over a network. The executable computer instructions may be, for example, binaries, intermediate format instructions such as assembly language, firmware, or source code. Examples of computer-readable media that may be used to store instructions, information used, and/or information created during methods according to described examples include magnetic or optical disks, solid-state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smartphones, small form factor personal computers, personal digital assistants, and so on. The functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

For clarity of explanation, in some instances the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program, or a collection of programs that carry out a specific function. In some embodiments, a service can be considered a server. The memory can be a non-transitory computer-readable medium.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, solid state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

What is claimed is:

1. A computer-implemented method for performance monitoring in a multicast network, comprising:
　　originating, at a source router, a probe data packet, wherein the probe data packet is configured to measure performance data associated with one or more legs of a multicast distribution tree from the source router to one or more receivers;

transmitting, by the source router to the one or more receivers, the probe data packet through the one or more legs of the multicast distribution tree using a probe identifier, wherein when received by a last hop router associated with one of the one or more legs of the multicast distribution tree, the last hop router redirects the probe data packet from the one or more receivers to a CPU of the last hop router configured to generate performance statistics, wherein the probe data packet collects performance statistics at each hop of the one or more legs of the multicast distribution tree; and receiving, by the source router, from the last hop router, the performance statistics.

2. The computer-implemented method of claim 1, further comprising:

analyzing the performance statistics to generate data associated with at least two of the one or more legs of the multicast distribution tree; and identifying a leg of the one or more legs for additional monitoring.

3. The computer-implemented method of claim 2, further comprising:

identifying one or more nodes associated with the leg of the one or more legs as intermediate nodes;

transmitting a second probe data packet and an instruction through the leg of the one or more legs using the probe identifier, wherein the instruction is transmitted on an underlay network and notifies the intermediate nodes of the second probe data packet; and receiving, from the intermediate nodes, a signal.

4. The computer-implemented method of claim 1, further comprising:

configuring, at a controller, a multicast group for performance monitoring by reserving an IP address for use in reporting performance statistics.

5. The computer-implemented method of claim 4, further comprising:

receiving, by the last hop router, a packet from a source and associated with the multicast group for performance monitoring as a destination IP address;

punting the packet to the CPU of the last hop router; and generating, by the CPU of the last hop router, the performance statistics.

6. The computer-implemented method of claim 1, wherein the probe data packet has a source address associated with the multicast distribution tree.

7. The computer-implemented method of claim 1, further comprising:

limiting the performance statistics to one or more selected legs of the one or more legs of the multicast distribution tree using a filter.

8. The computer-implemented method of claim 1, further comprising:

configuring, by a controller, the last hop router to be turned on to be responsive to a probe for performance monitoring.

9. A system comprising:

one or more processors; and a memory storing instructions that, when executed by the one or more processors, configure the system to:

cause, by a controller, a source router to originate a probe data packet;

originate, at the source router, the probe data packet, wherein the probe data packet is configured to measure performance data associated with one or more legs of a multicast distribution tree from the source router to one or more receivers;

transmit, by the source router to the one or more receivers, the probe data packet through the one or more legs of the multicast distribution tree using a probe identifier, wherein when received by a last hop router associated with one of the one or more legs of the multicast distribution tree, the last hop router redirects the probe data packet from the one or more receivers to a CPU of the last hop router configured to generate performance statistics, wherein the probe data packet collects performance statistics at each hop of the one or more legs of the multicast distribution tree; and receive, by the source router, from the last hop router, the performance statistics.

10. The system of claim 9, wherein the instructions further configure the system to:

analyze the performance statistics to generate data associated with at least two of the one or more legs of the multicast distribution tree; and identify a leg of the one or more legs for additional monitoring.

11. The system of claim 10, wherein the instructions further configure the system to:

identify one or more nodes associated with the leg of the one or more legs as intermediate nodes;

transmit a second probe data packet and an instruction through the leg of the one or more legs using the probe identifier, wherein the instruction is transmitted on an underlay network and notifies the intermediate nodes of the second probe data packet; and receive, from the intermediate nodes, a signal.

12. The system of claim 9, wherein the instructions further configure the system to:

configure, at the controller, a multicast group for performance monitoring by reserving an IP address for use in reporting performance statistics.

13. The system of claim 12, wherein the instructions further configure the system to:

receive, by the last hop router, a packet from a source and associated with the multicast group for performance monitoring as a destination IP address;

punt the packet to the CPU of the last hop router; and generate, by the CPU of the last hop router, the performance statistics.

14. The system of claim 9, wherein the probe data packet has a source address associated with the multicast distribution tree.

15. The system of claim 9, wherein the instructions further configure the system to:

limit the performance statistics to one or more selected legs of the one or more legs of the multicast distribution tree using a filter.

16. The system of claim 9, wherein the instructions further configure the system to:

configure, by the controller, the last hop router to be turned on to be responsive to a probe for performance monitoring.

17. A non-transitory computer-readable storage medium, the non-transitory computer-readable storage medium including instructions that when executed by a computer, cause the computer to:

cause, by a controller, a source router to originate a probe data packet;

originate, at the source router, the probe data packet, wherein the probe data packet is configured to measure performance data associated with one or more legs of a multicast distribution tree from the source router to one or more receivers;

transmit, by the source router to the one or more receivers, the probe data packet through the one or more legs of the multicast distribution tree using a probe identifier, wherein when received by a last hop router associated with one of the one or more legs of the multicast distribution tree, the last hop router redirects the probe data packet from the one or more receivers to a CPU of the last hop router configured to generate performance statistics, wherein the probe data packet collects performance statistics at each hop of the one or more legs of the multicast distribution tree; and receive, by the source router, from the last hop router, the performance statistics.

18. The non-transitory computer-readable storage medium of claim 17, wherein the instructions further configure the computer to:

analyze the performance statistics to generate data associated with at least two of the one or more legs of the multicast distribution tree; and identify a leg of the one or more legs for additional monitoring.

19. The non-transitory computer-readable storage medium of claim 18, wherein the instructions further configure the computer to:

identify one or more nodes associated with the leg of the one or more legs as intermediate nodes;

transmit a second probe data packet and an instruction through the leg of the one or more legs using the probe identifier, wherein the instruction is transmitted on an underlay network and notifies the intermediate nodes of the second probe data packet; and receive, from the intermediate nodes, a signal.

20. The non-transitory computer-readable storage medium of claim 17, wherein the instructions further configure the computer to:

configure, at the controller, a multicast group for performance monitoring by reserving an IP address for use in reporting performance statistics.

* * * * *